United States Patent
Shimizu et al.

(10) Patent No.: US 9,020,643 B2
(45) Date of Patent: Apr. 28, 2015

(54) ROBOT APPARATUS, CONTROL METHOD THEREOF, AND COMPUTER PROGRAM

(71) Applicant: Sony Corporation, Tokyo (JP)

(72) Inventors: Satoru Shimizu, Tokyo (JP); Wataru Kokubo, Tokyo (JP); Akichika Tanaka, Chiba (JP); Tetsuharu Fukushima, Tokyo (JP)

(73) Assignee: Sony Corporation, Tokyo (JP)

( * ) Notice: Subject to any disclaimer, the term of this patent is extended or adjusted under 35 U.S.C. 154(b) by 228 days.

(21) Appl. No.: 13/675,182

(22) Filed: Nov. 13, 2012

(65) Prior Publication Data

US 2013/0144440 A1 Jun. 6, 2013

(30) Foreign Application Priority Data

Dec. 1, 2011 (JP) ................................ 2011-263264

(51) Int. Cl.
| | | |
|---|---|---|
| G05B 19/00 | (2006.01) | |
| B25J 13/08 | (2006.01) | |
| B25J 9/16 | (2006.01) | |
| B25J 11/00 | (2006.01) | |

(52) U.S. Cl.
CPC .............. *B25J 13/088* (2013.01); *B25J 9/1664* (2013.01); *B25J 11/0005* (2013.01); *B25J 11/008* (2013.01)

(58) Field of Classification Search
CPC .... B25J 9/0003; B25J 11/0005; B25J 11/008; B25J 9/1664; G05B 2219/39478

USPC .......... 700/245, 258, 259, 262; 901/1, 2, 8, 9, 901/46, 47
See application file for complete search history.

(56) References Cited

U.S. PATENT DOCUMENTS

| | | | | |
|---|---|---|---|---|
| 7,747,351 | B2 * | 6/2010 | Tsusaka et al. | ................ 700/245 |
| 7,778,732 | B2 * | 8/2010 | Adachi et al. | ................. 700/245 |
| 7,944,476 | B2 * | 5/2011 | Ito et al. | ................... 348/208.16 |
| 8,452,451 | B1 * | 5/2013 | Francis et al. | ................ 700/258 |
| 2003/0229474 | A1 * | 12/2003 | Suzuki et al. | ................. 702/188 |
| 2006/0126918 | A1 * | 6/2006 | Oohashi et al. | ............... 382/153 |
| 2006/0176182 | A1 * | 8/2006 | Noguchi et al. | ........... 340/573.1 |
| 2007/0296825 | A1 * | 12/2007 | Ito et al. | ..................... 348/222.1 |
| 2010/0087955 | A1 * | 4/2010 | Tsusaka et al. | ................ 700/245 |
| 2010/0185328 | A1 * | 7/2010 | Kim et al. | ...................... 700/259 |

FOREIGN PATENT DOCUMENTS

| | | |
|---|---|---|
| JP | 2005-342873 | 12/2005 |
| JP | 2006-247780 | 9/2006 |
| JP | 2007-268696 | 10/2007 |

* cited by examiner

*Primary Examiner* — Khoi Tran
*Assistant Examiner* — Jorge Peche
(74) *Attorney, Agent, or Firm* — Hazuki International, LLC

(57) ABSTRACT

A robot apparatus includes a reception arm determination unit that determines from a left arm or a right arm of a user a reception arm which is used in handing of an object; a hand location calculation unit that calculates a current location of a hand of the reception arm; and a handing operation unit that performs an object handing operation at the location of the hand of the reception arm which is calculated using the hand location calculation unit.

9 Claims, 13 Drawing Sheets

CAMERA IMAGE $|\theta| > \theta_{th}$

CAMERA IMAGE $|\theta| < \theta_{th}$

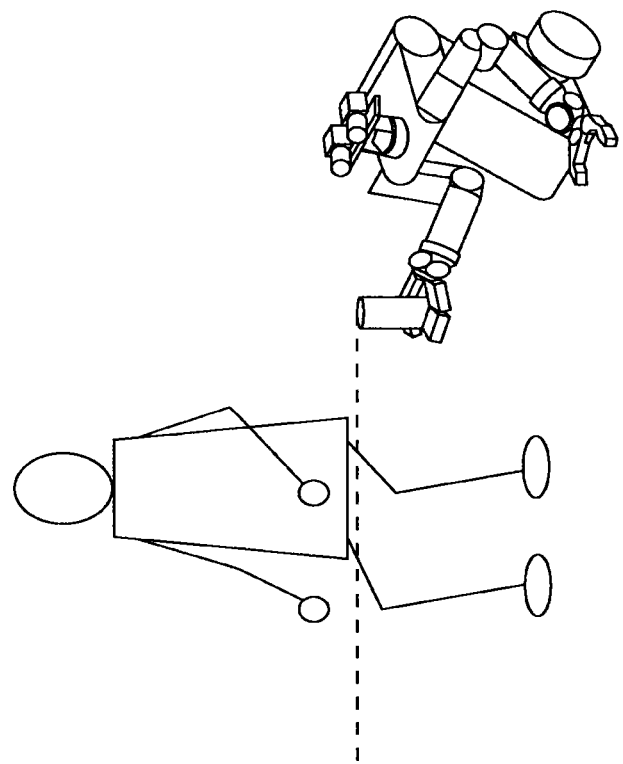
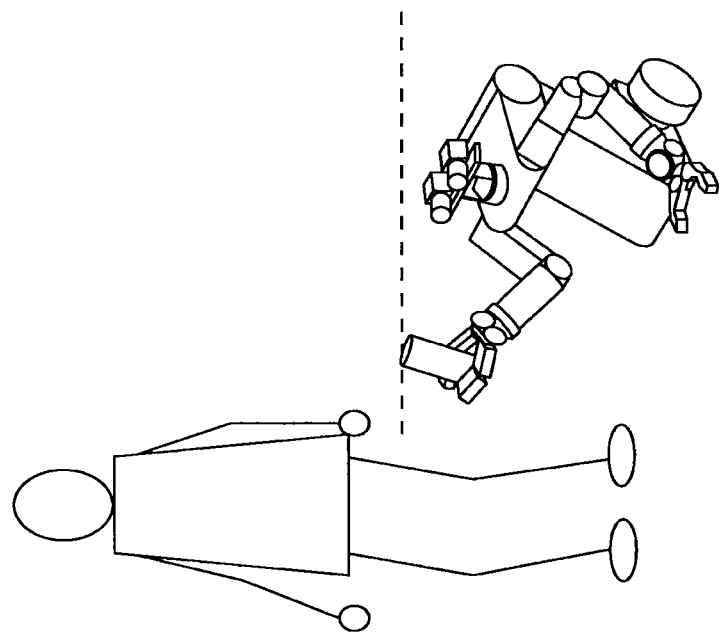

ROBOT APPARATUS, CONTROL METHOD THEREOF, AND COMPUTER PROGRAM

BACKGROUND

The present technology relates to a robot apparatus (hereinafter referred simply to "a robot") which works in real life situations of a user, for example, livelihood support such as housekeeping, wellbeing, nursing, or aid, and relates to a control method thereof and a computer program. In particular, the present technology relates to a robot which performs object transfer interaction, that is, handing operation, with a user, and relates to a control method thereof and a computer program.

A robot which is designed to perform routine tasks and is installed in a factory has been known in the related art. In recent years, a robot which can perform various types of operation has been increasingly realized. The latter robot is applied to fields such as welfare, nursing, and aid, and for example, such a robot fetches a desired object and hands it to a physically handicapped person.

However, if the robot performs an operation of handing to a user without taking into consideration the body characteristics of the user, unnecessary burdens may be placed on the user who receives the object. For example, if the robot attempts to hand an object from left side to the user having a handicap on the left side of the body, a burden is placed on the user. In the worst case, it is difficult for the user to receive the object.

In addition, even when a user is an able-bodied person, if the robot attempts to hand an object to the person from an opposite side to handedness, the user may be under stress. There is risk of the user failing to receive the object, thereby dropping and damaging the object.

Additionally, if the robot attempts to hand an object to a user without taking into consideration the location or the height of a hand of a user who receives the object, it is difficult for a tall user to receive the object without bending down, thus physical suffering is imparted on the user.

Thus, a communication robot has been proposed. This robot determines a degree of intimacy with a user on the basis of the distance between the user and the robot or the time period during the user is looking at the robot, and which updates an interaction parameter such that interaction is optimized (for example, refer to Japanese Unexamined Patent Application Publication No. 2006-247780). Although the above-described communication robot may also update a communication parameter, the robot does not take into consideration a posture of a user being standing or sitting, etc., and a handedness of the user. Therefore, even though it is effective in the procedure in which the communication robot establishes an optimized interaction with the user, comfortable interaction in which burdens are not placed on the user is not performed once the optimized relationship has been established.

In addition, a robot has been proposed which synchronizes with an operation of a user and further varies the synchronization relationship (for example, refer to Japanese Unexamined Patent Application Publication No. 2005-342873). However, the word "synchronization" means "engagement," thus it is substantially different from the consideration of the user body characteristics or interaction performed without placing a burden on the user.

In addition, a dialogue robot, which recognizes a user and the direction of the user using a wireless tag or an infrared tag and which provides service and content which are appropriate for the user, has been proposed (for example, refer to Japanese Unexamined Patent Application Publication No. 2007-268696). However, the conversation robot provides service and content which are appropriate for the user even when the user indicates interest toward the direction of the robot while the user is not in front of the robot, or when the user is not facing in the direction of the robot, thus it is substantially different from the interaction performed while the user body characteristics, such as facing the direction of the user, are considered.

SUMMARY

It is desirable to provide an excellent robot which is capable of performing object transfer interaction with a user without placing excessive burdens on the user, a control method thereof, and a computer program.

According to a first embodiment of the present technology, there is provided a robot including: a reception arm determination unit that determines from a left arm or a right arm of a user a reception arm which is used in handing of an object; a hand location calculation unit that calculates a current location of a hand of the reception arm; and a handing operation unit that performs an object handing operation at the location of the hand of the reception arm which is calculated using the hand location calculation unit.

According to a second embodiment of the present technology, the reception arm determination unit of the robot according to the first embodiment may determine the reception arm of the user based on body characteristic information which is related to the dominant arm of the user, the presence of disabilities of an arm, or an arm which easily performs an object reception operation.

According to a third embodiment of the present technology, the robot according to the second embodiment may further include the body characteristic information, which is related to the dominant arm, the presence of disabilities of the arm, or the arm which easily performs the object reception operation for each user, in a user body characteristic database as previous knowledge. Further, the reception arm determination unit may acquire the body characteristic information, which is related to the dominant arm of the user who performs object transfer, the presence of disabilities of the arm, or the arm which easily performs the object reception operation, with reference to the user body characteristic database.

According to a fourth embodiment of the present technology, the robot according to the first embodiment may further include a user stature information acquisition unit that acquires information related to stature of the user; and a user posture determination unit that determines current posture of the user. Further, the hand location calculation unit may calculate the current location of the hand of the reception arm based on the stature of the user and the current posture of the user.

According to a fifth embodiment of the present technology, the robot according to the fourth embodiment may further include body characteristic information, which is related to the stature for each user, in the user body characteristic database as the previous knowledge. Further, the hand location calculation unit may acquire the body characteristic information, which is related to the stature of the user who performs object transfer with reference to a user body characteristic database.

According to a sixth embodiment of the present technology, the robot according to the fourth embodiment may further include a body model of each posture, that is, standing, lying, or sitting. Further, the hand location calculation unit may calculate the current location of the hand of the reception arm by applying the stature of the user which is acquired using the user stature information acquisition unit to a body model corresponding to the current posture of the user which is determined using the user posture determination unit.

According to a seventh embodiment of the present technology, the robot according to the fourth embodiment may further include a face position calculation unit that calculates a location of a face of the user. Further, the user posture determination unit may determine whether or not the posture of the user is standing by comparing the stature of the user which is acquired using the user stature information acquisition unit with the location of the face of the user.

According to an eighth embodiment of the present technology, the robot according to the seventh embodiment may further include a face posture detection unit that detects posture of the face of the user. Further, the user posture determination unit, when the posture of the user is not standing, may determine whether the posture of the user is lying or sitting based on the posture of the face of the user which is detected using the face posture detection unit.

According to a ninth embodiment of the present technology, the robot according to the first embodiment may further include: a movement unit that moves a location of the robot; and an arm section that is capable of grasping the object. Further, the handing operation unit may perform an operation of moving to the reception arm of the user using the movement unit, and may present the object which is grasped using the arm section to the location of the hand of the reception arm.

According to a tenth embodiment of the present technology, the robot according to the fourth embodiment may further include an environmental map that is related to surrounding environments of the robot. Further, the user posture determination unit may determine the current posture of the user by referring to the environmental map for environments of the location of the user.

In addition, according to an eleventh embodiment of the present technology, there is provided a robot control method including: determining a reception arm of a right arm or a left arm of a user which is used in handing of an object; calculating a current location of a hand of the reception arm; and performing an object handing operation at the location of the hand of the reception arm which is calculated using the hand location calculation unit.

In addition, according to a twelfth embodiment of the present technology, there is provided a computer program written in a computer-readable format in order to control a robot and causing a computer to function as: a reception arm determination unit that determines from a left arm or a right arm of a user a reception arm which is used in handing of an object; a hand location calculation unit that calculates a current location of a hand of the reception arm; and a handing operation unit that performs an object handing operation at the location of the hand of the reception arm which is calculated using the hand location calculation unit.

The computer program according to the twelfth embodiment of the present technology defines a computer program written in a computer-readable format such that a predetermined process is implemented on the computer. In other words, when the computer program according to the twelfth embodiment of the present technology is installed on the computer, a cooperative operation is exhibited on the computer, thus it is possible to obtain the same operational effect as the robot according to the first embodiment of the present technology.

According to the present technology disclosed in the specification, it is possible to provide an excellent robot which is capable of performing object transfer interaction with a user without placing an excessive burden on the user by taking into consideration user body characteristics, a control method thereof, and a computer program.

According to the technology disclosed in the specification, the robot can determine the dominant arm of the user and can determine which of the right side of the body or the left side of the body is easier for the user to operate (or, is good at operating) due to hemiplegia or fractures. Further, an object can be handed while taking into consideration the direction in which the user easily receives the object and the height at which a hand of the user reaches and the user easily receives the object based on body characteristics, such as the stature of the user and the current posture of the user (sitting on sofa or sleeping on the bed).

According to the technology disclosed in the specification, a user can receive an object with relaxed posture (without fatigue). That is, the user can perform natural interaction with the robot along with the burden being reduced when the object is received from the robot.

Other objects, features, and advantages of the technology disclosed in the specification will be apparent using more detailed description based on embodiments, which will be described later, or the accompanying drawings.

BRIEF DESCRIPTION OF THE DRAWINGS

FIGS. 11A and 11B are views illustrating a situation in which the robot presents an object to the location of a hand of the dominant arm of a standing user, and a situation in which the robot presents the object to the location of the hand of the dominant arm of a sitting user.

DETAILED DESCRIPTION OF EMBODIMENTS

Embodiments of the technology disclosed in the specification will be described in detail with reference to the accompanying drawings below.

Figure 1:
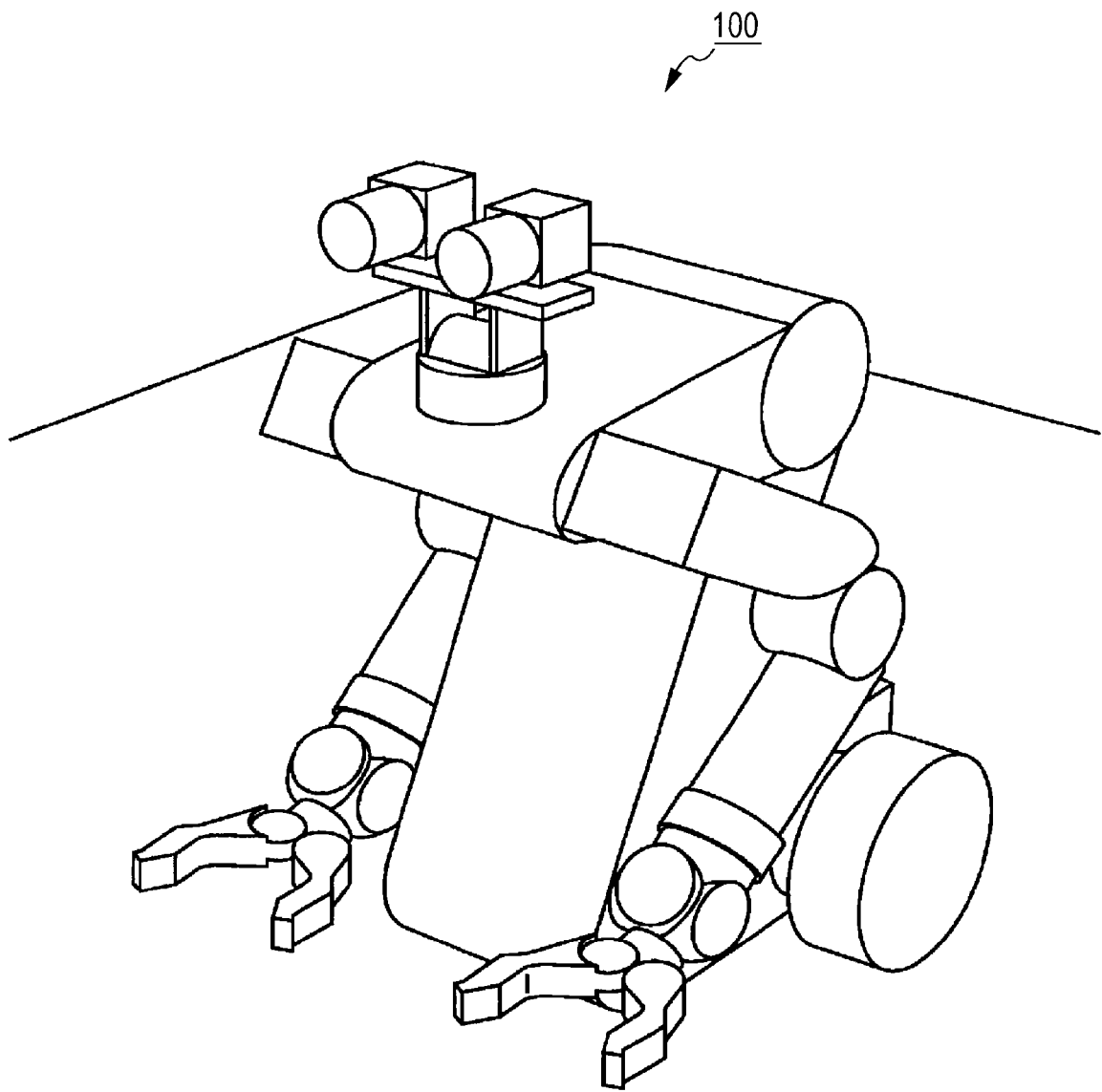
FIG. 1 is a view illustrating the external appearance of a robot to which the technology disclosed in the specification can be applied.
Figure 2:
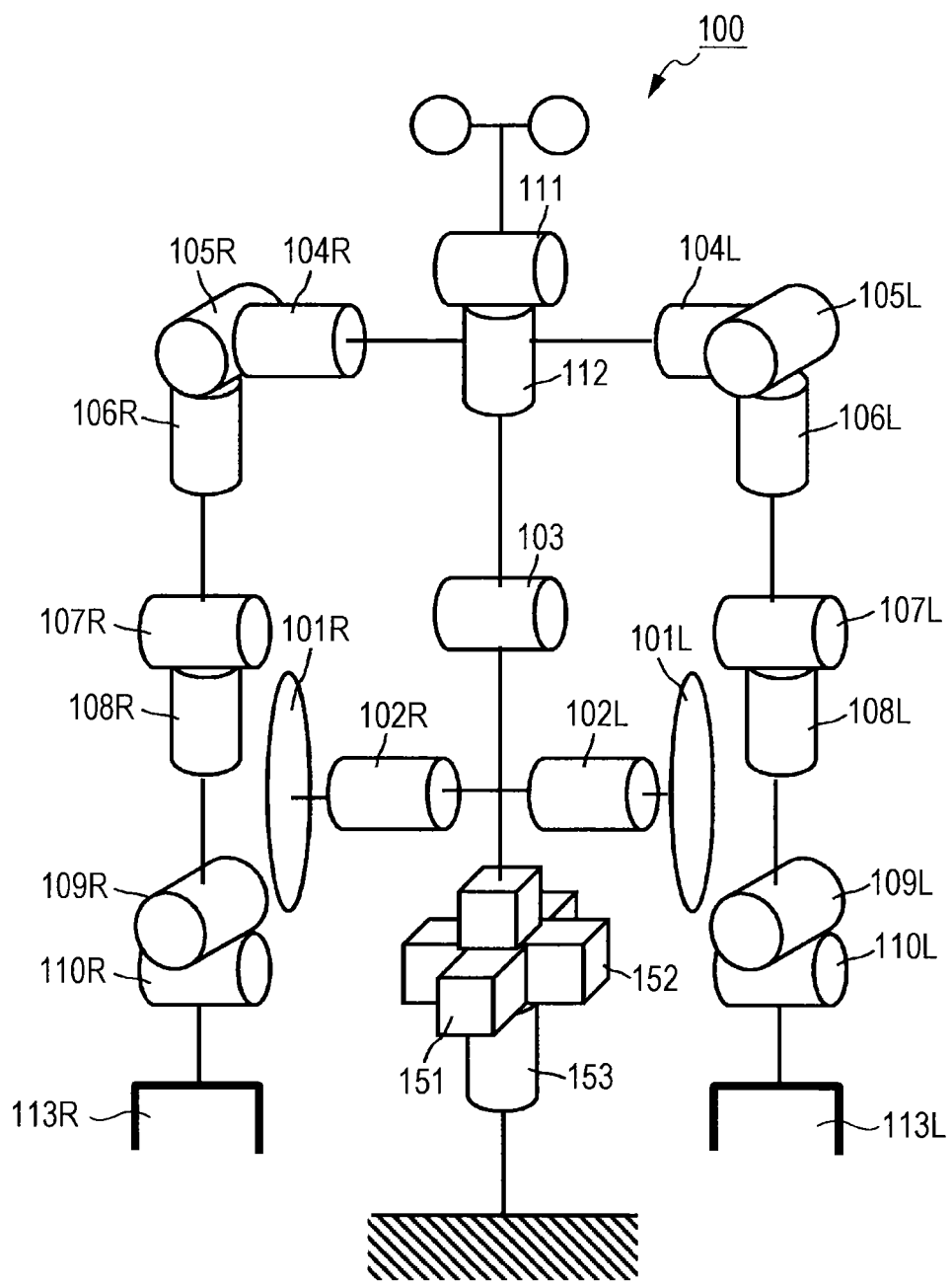
FIG. 2 is a view schematically illustrating the configuration of the joint degrees of freedom (DOF) of the robot to which the technology disclosed in the specification can be applied.

FIG. 1 shows the external appearance of a robot 100 to which the technology disclosed in the specification can be applied. The robot 100 has a link structure in which a plurality of links are connected using joints, and each joint is operated using an actuator. In addition, FIG. 2 schematically shows the degrees of freedom (DOE) in the joint configuration of the robot 100. Although the robot 100 shown in the drawing is installed in an ambient environment, such as a home, which dynamically varies from moment to moment, and is configured to perform livelihood support, such as housework or nursing, the robot 100 may be installed in a factory and may execute a routine task.

The robot 100 shown in the drawing is a dual-arm type, and includes two drive wheels 101R and 101L, which face a base portion, as movement sections. The respective drive wheels 101R and 101L are respectively driven by drive wheel actuators 102R and 102L which rotate around a pitch. Meanwhile, in FIG. 2, reference numerals 151, 152, and 153 indicate unreal under-actuated joints, respectively correspond to a translational degree of freedom in the X direction (longitudinal direction), a translational degree of freedom in the Y direction (lateral direction), and a rotational degree of freedom around a yaw with respect to the floor surface of the robot 100, and shows that the robot 100 moves around a virtual world.

The movement sections are connected to an upper body through a waist joint. The waist joint is driven by a waist joint pitch axis actuator 103 which rotates around the pitch. The upper body includes two right and left arm sections, and a head portion which is connected through a neck joint. Each of the right and left arm sections has a total of 7 DOFs including a 3-DOF shoulder joint, a 2-DOF elbow joint, and a 2-DOF wrist joint. The 3-DOF shoulder joint is driven by a shoulder joint pitch axis actuator 104R or 104L, a shoulder joint roll axis actuator 105R or 105L, and a shoulder joint yawing axis actuator 106R or 106L. The 2-DOF elbow joint is driven by an elbow joint pitch axis actuator 107R or 107L and an elbow joint yawing axis actuator 108R or 108L. The 2-DOF wrist joint is driven by a wrist joint roll axis actuator 109R or 109L and a wrist joint pitch axis actuator 110R or 110L. In addition, a 2-DOF neck joint is driven by a neck joint pitch axis actuator 111 and a neck joint yawing axis actuator 112. In addition, 1-DOF hand joint of the end of each of the right and left arm sections is driven by a hand joint roll axis actuator 113R or 113L. In the embodiment, when the hand joint roll axis actuator 113R or 113L is driven, it is possible to implement an operation of grasping an object using fingers.

Meanwhile, although the robot 100 shown in the drawing includes two-wheeled-type movement sections which face each other, the gist of the technology disclosed in the specification is not limited to the two-wheeled-type movement sections which face to each other. For example, it is possible to apply the technology disclosed in the specification to a robot 100 which includes leg-type movement sections in the same way.

A reduction gear which is used to obtain sufficient generative force is attached to the actuator on each axis in addition to an encoder which is used to measure a joint angle, a motor which is used to generate torque, and a current control-type motor driver which is used to drive the motor. In addition, a microcomputer which is used to perform drive control on the actuator is set on the actuator (neither is shown in FIG. 2).

The arithmetic of dynamics of the robot 100 is executed on a host computer, and the torque of the joint actuator or the target control value of the joint angle is generated. The target control value is transmitted to a control microcomputer which is set on the actuator, and is used to control the actuator which is executed on the control microcomputer. In addition, each joint actuator is controlled based on a force control method or a position control method.

Figure 3:
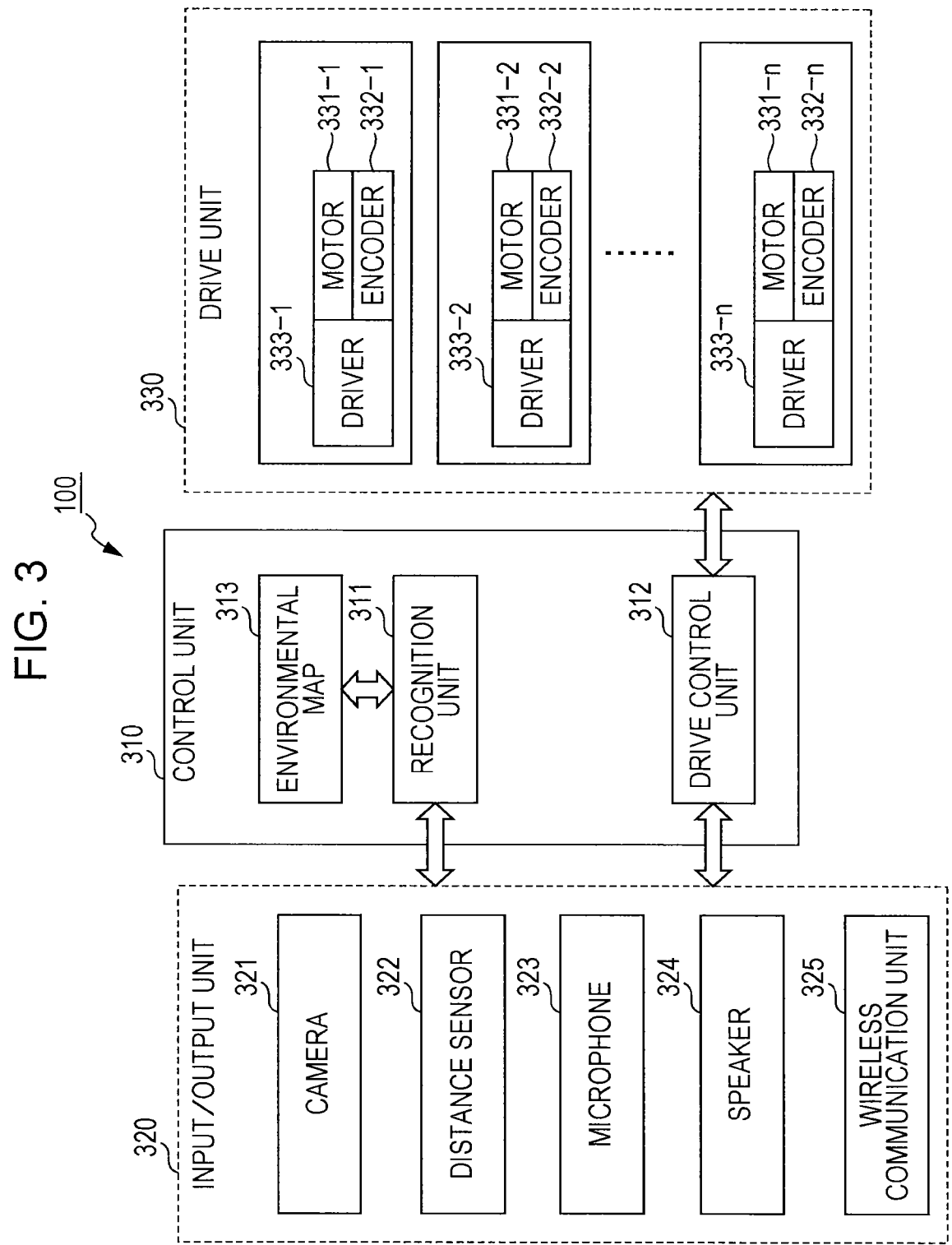
FIG. 3 is a view schematically illustrating the configuration of the control system of the robot shown in FIG. 1.

FIG. 3 schematically shows the configuration of the control system of the robot 100 shown in FIG. 1. The robot 100 includes a control unit 310 which generally controls overall operations and performs the other data processing, an input/output unit 320, and a drive unit 330. Each of the units will be described below.

The input/output unit 320 includes a camera 321 which corresponds to the eye of the robot 100, a distance sensor 322, and a microphone 323 which corresponds to the ear of the robot 100 as input units. In addition, the input/output unit 320 includes a speaker 324 which corresponds to the mouth of the robot 100, as an output unit. Here, the camera 321 is a stereo camera, and can perform a positioning operation. In addition, the distance sensor 322 includes a space sensor, for example, such as a laser range finder. In addition, the robot 100 can receive a task instruction by, for example, inputting the voice of a user from the microphone 323. However, the robot 100 may include another task instruction input unit (not shown) in a wired or wireless manner or through a recording media.

In addition, the input/output unit 320 includes a wireless communication unit 325. The robot 100 can perform data communication with the tablet terminal (not shown) of the user through a communication path, such as Wi-Fi (Wireless Fidelity), using the wireless communication unit 325.

The drive unit 330 is a functional module which is used to implement the degree of freedom of each of the joints of the robot 100, and includes a plurality of drive units which are installed on respective axes, such as roll, pitch, and yaw of each of the joints. Each of the drive units is configured by combining a motor 331 which performs a rotation motion around a predetermined axis, an encoder 332 which detects the rotation position of the motor 331, and a driver 333 which adaptively controls the rotation position and rotation speed of the motor 331 based on output from the encoder 332.

The control unit 310 includes a recognition unit 311, a drive control unit 312, and an environmental map 313.

The recognition unit 311 recognizes surrounding environments based on information which is obtained from the input unit, that is, the camera 321 or the distance sensor 322, of the input/output unit 320. For example, the recognition unit 311 constructs the environmental map 313 in advance or updates the environmental map 313 based on the position posture information of the camera 321, which is obtained by performing an own position presumption process of presuming the position of the camera 321, and object information, which is obtained by performing an image recognition process of detecting an object from an image photographed using the camera 321.

The drive control unit 312 controls the output unit of the input/output unit 320, and the drive of the drive unit 330. For example, the drive control unit 312 controls the drive unit 330 such that the robot 100 implements a task. Here, the task which is implemented by the robot 100 includes physical interaction with the user, such as the handing of an object indicated by the user, and causes the drive wheel actuators 102R and 102L or each of the joint actuators of each of the arm sections to be driven in order to implement the interaction.

If the robot 100 performs the object transfer interaction while hardly taking into consideration user body characteristics, a considerable burden is placed on the user who receives the object. In the worst case, it is difficult to hand the object to the user. Therefore, in the embodiment, the robot 100 takes into consideration the user body characteristics when the object transfer interaction is performed, thus an excessive burden is not imposed on the user.

Figure 4:
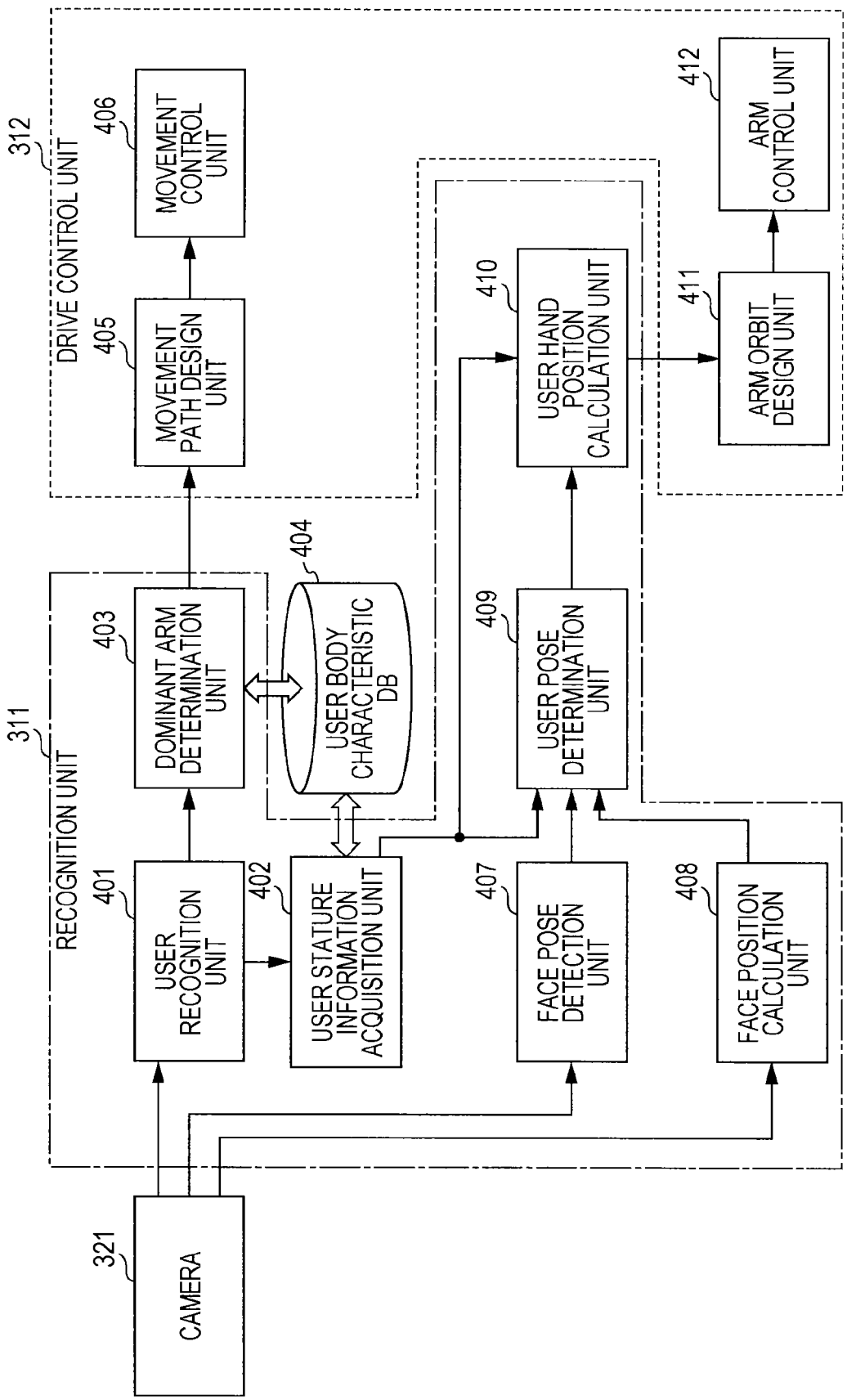
FIG. 4 is a view schematically illustrating a functional configuration used such that the robot implements object transfer interaction.

FIG. 4 schematically shows a functional configuration which is used such that the robot 100 implements the object transfer interaction. Basically, functional blocks which are shown in the drawing are respectively implemented as processes which are executed using the above-described recognition unit 311 and the drive control unit 312.

A user recognition unit 401 recognizes the user by performing facial recognition on the image photographed using the camera 321, and outputs user identification information (user ID) to a user stature information acquisition unit 402 and a dominant arm determination unit 403. As a modification, the user possesses an RFID tag and the user recognition unit 401 is equipped with a tag reader, thus the user ID may be read from the RFID tag.

A user body characteristic database 404 manages the body characteristics of each user using the user ID. The body characteristics managed using the user body characteristic database 404 will be described in detail later. The user stature information acquisition unit 402 inquires of the user body characteristic database 404 about the user ID, which is received from the user recognition unit 401, and acquires user stature information. In addition, the dominant arm determination unit 403 inquires of the user body characteristic database 404 about the user ID, which is received from the user recognition unit 401, and determines the dominant arm of the user. Meanwhile, the user body characteristic database 404 may be equipped in the robot 100 and may be installed on the outside through a communication channel.

A movement path design unit 405 designs a movement path used to approach the dominant arm of the user, which is determined using the dominant arm determination unit 403. Thereafter, a movement control unit 406 controls the drive of the drive wheel actuators 102R and 102L in order to move along the movement path which is designed using the movement path design unit 405.

A face posture detection unit 407 detects the posture of the face of the user by performing a face detection process on the image photographed using the camera 321. In addition, a face location calculation unit 408 calculates the location (height) of the face of the user by performing the face detection process on the image photographed using the camera 321.

A user posture determination unit 409 determines the current posture of the user based on the user stature information which is acquired using the user stature information acquisition unit 402, the posture of the face which is detected using the face posture detection unit 407, and the location of the face which is calculated using the face location calculation unit 408. It is possible to determine whether or not the user is standing based on the current location (height) of the face with respect to the stature of the user. In addition, when the user is not standing, a case where the user is lying and a case where the user is sitting may be taken into consideration. Either of the cases can be determined based on the posture of the face.

Meanwhile, the robot 100 generates and updates the environmental map 313 at the same time that the self-location presumption is performed (described above). A user posture determination unit 409 can be configured to presume the posture of the user using the information of the environmental map 313. For example, when the face of the user is on a bed, it is possible to determine that there is a strong possibility that the user is sleeping.

A user hand location calculation unit 410 calculates the current location of the hand of the dominant arm of the user based on the posture of the user, which is determined using the user posture determination unit 409. As described later, it is possible to calculate the location of the hand of the user by applying the user stature information, which is acquired using the user stature information acquisition unit 402, to the body models of the respective postures, that is, standing, lying, and sitting.

An arm orbit design unit 411 designs the orbit of either one of the right and left arm sections in order to transfer the object at the location of the hand of the user which is calculated using the user hand location calculation unit 410. Thereafter, an arm control unit 412 controls the drive of each of the joint actuators of the arm section such that the arm section moves along the orbit of the arm section which is designed using the arm orbit design unit 411.

Figure 5:
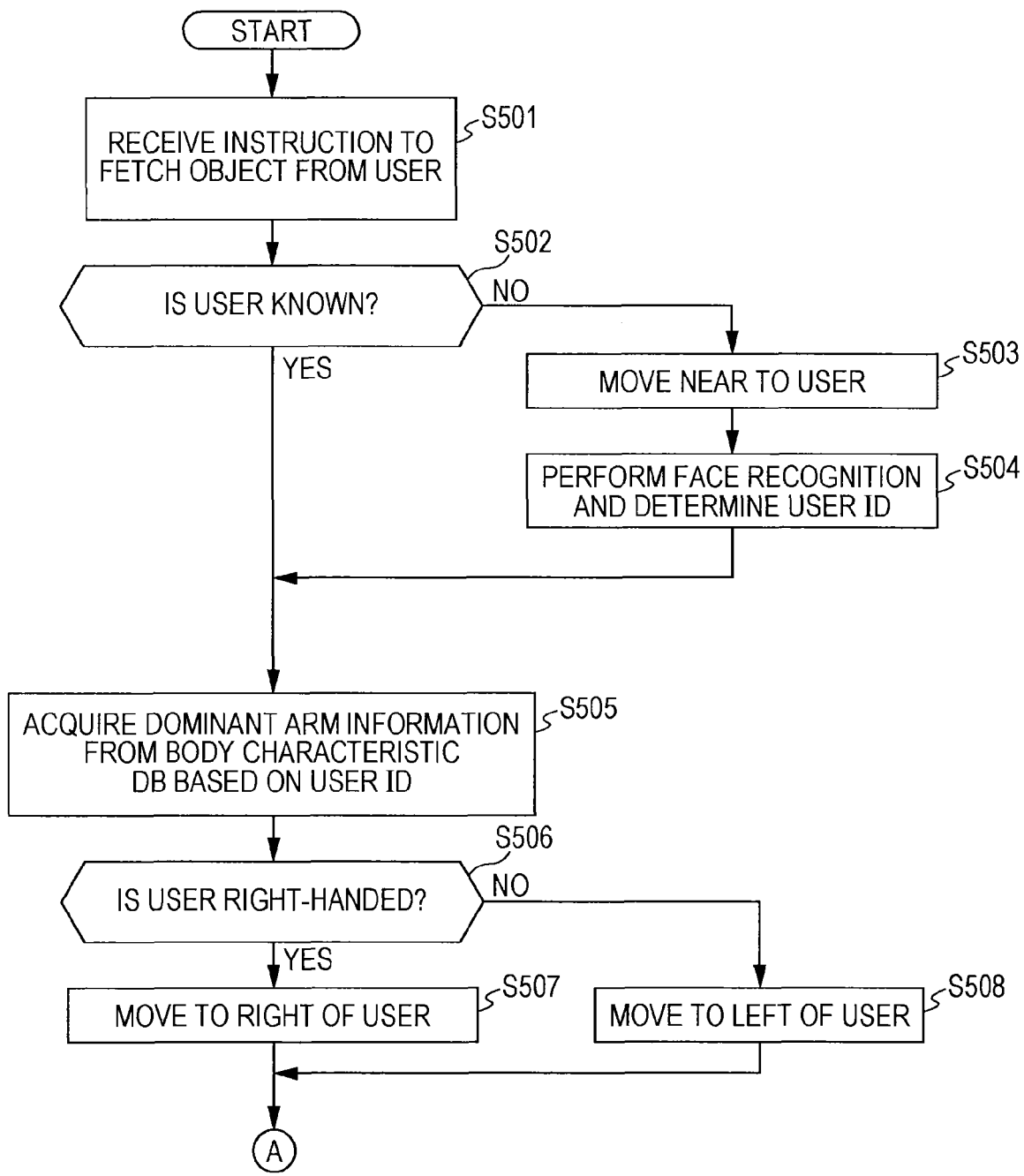
FIG. 5 is a flowchart illustrating a processing procedure (which is performed from when an instruction to transfer an object is received from the user to when the robot comes near to the user) used such that the robot implements the object transfer interaction.
Figure 6:
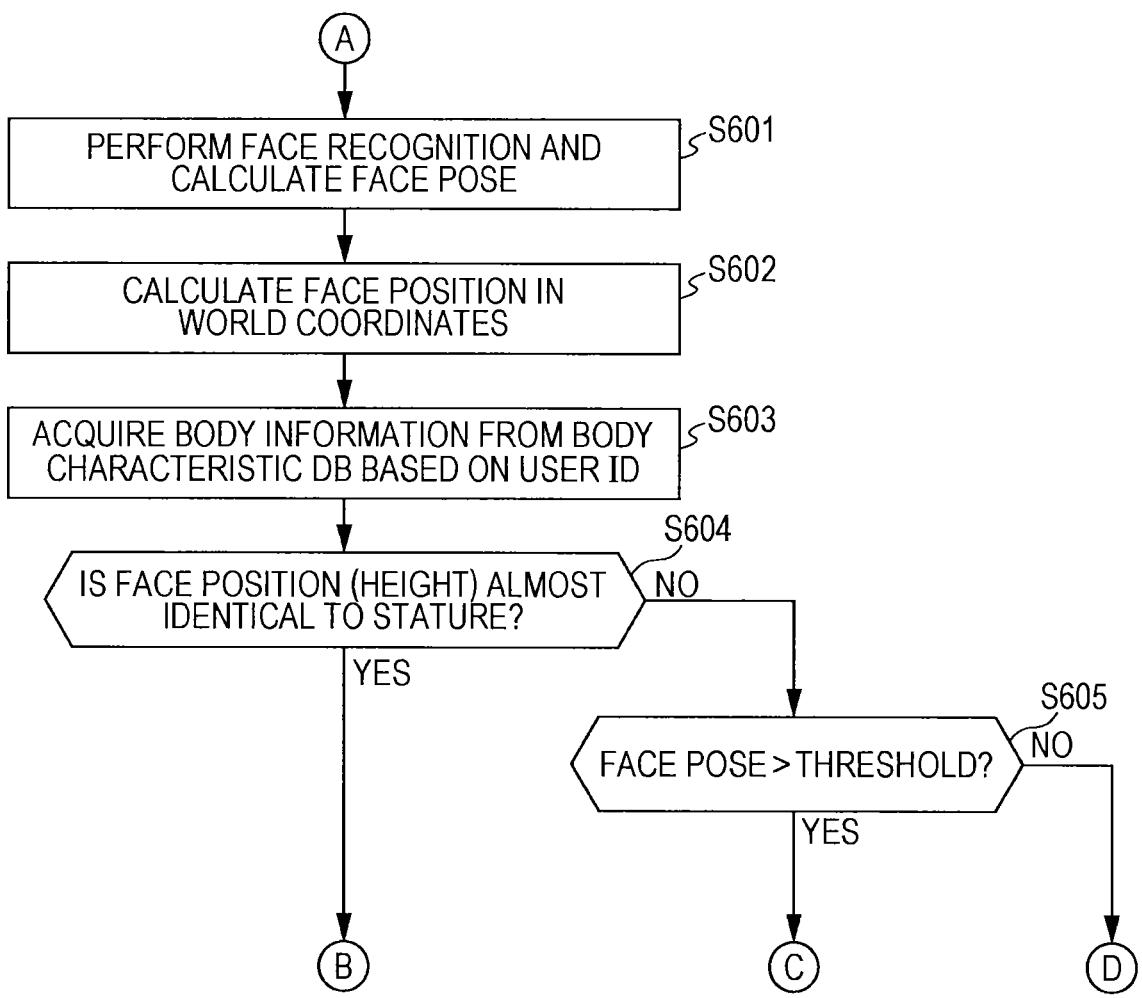
FIG. 6 is a flowchart illustrating a processing procedure (user posture presumption) used such that the robot implements the object transfer interaction.
Figure 7:
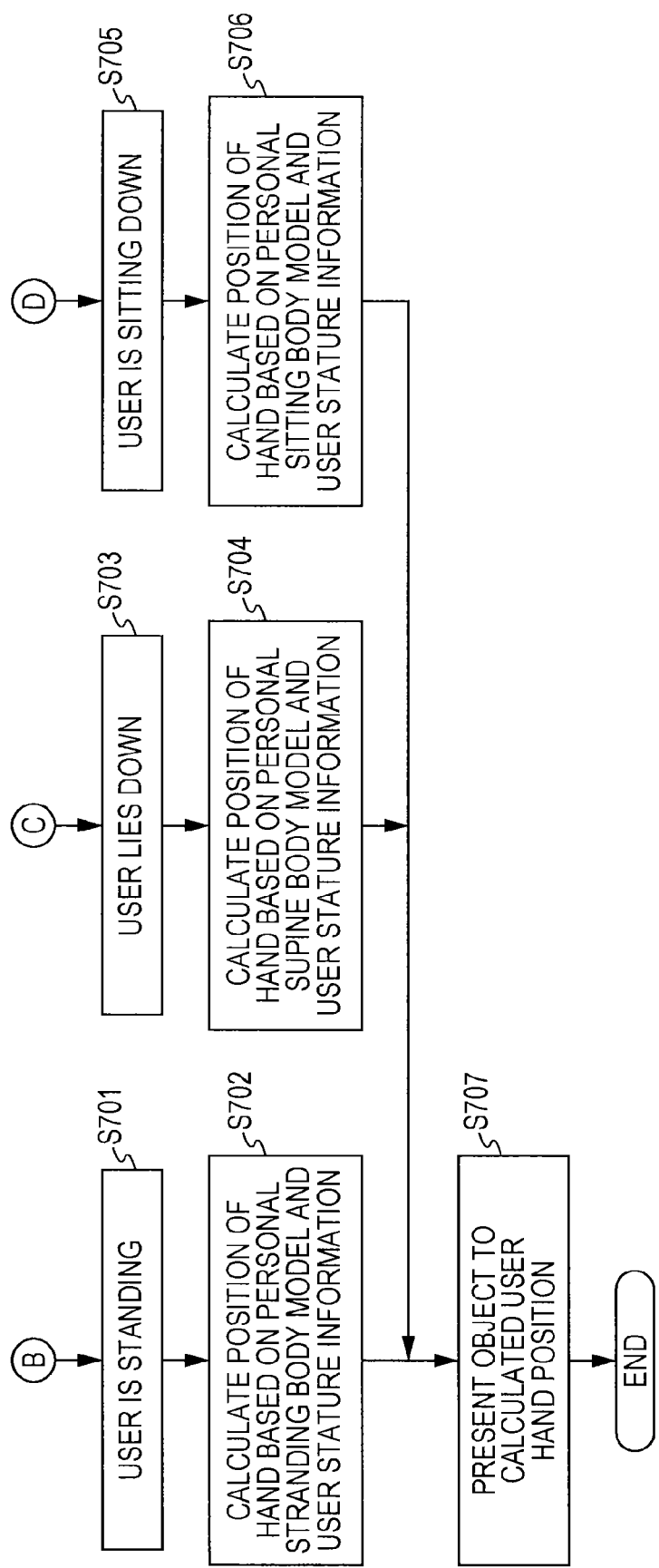
FIG. 7 is a flowchart illustrating a processing procedure (which is performed from when the location of the hand of the user is presumed to when the object is handed) used such that the robot implements the object transfer interaction.

FIGS. 5 to 7 show the processing procedures in the form of flowcharts, which are used such that the robot 100 implements the object transfer interaction. Here, FIG. 5 shows a processing procedure which is performed from when an instruction to transfer an object is received from the user to when the robot comes near to the user, FIG. 6 shows a processing procedure of presuming the posture of the user, and FIG. 7 shows a processing procedure which is performed from when the location of the hand of the user is presumed to when the object is handed.

First, the processing procedure which is performed from when an instruction to transfer the object is received from the user to when the robot 100 comes near to the user will be described with reference to FIG. 5.

First, the robot 100 receives an instruction to fetch an object from the user in step S501. Although the method of receiving the instruction from the user is not shown in the drawing, the method can be performed using voice or communication from a table terminal. In addition, at a time point that the instruction from the user is received, it is assumed that the robot 100 acquires the general location of the user (when the instruction is given using voice, location information can be acquired using a sound source direction presumption technology. In addition, when the user gives the instruction from the tablet terminal, the location information can be acquired using communication).

Subsequently, the user recognition unit 401 determines whether or not the user who gives the instruction is a known user in step S502.

Here, when the user who gives the instruction is not known (No in step S502), the robot 100 moves near to the user in step S503. Thereafter, the user recognition unit 401 determines the user ID by performing facial recognition using an image photographed using the camera 321 or by performing personal recognition using a wireless tag in step S504.

Subsequently, the dominant arm determination unit 403 inquires of the user body characteristic database 404 about the user ID, which is received from the user recognition unit 401, and acquires user dominant arm information in step S505, and determines the dominant arm in step S506. Meanwhile, the "dominant arm" referred to here is not limited to the dominant arm of the original meaning (described later).

Thereafter, if the user is right-handed (Yes in step S506), the movement path design unit 405 designs a movement path in order to approach the right arm of the user, and the movement control unit 406 causes the robot 100 to move to the right arm side of the user along the movement path in step S507. In addition, if the user is left-handed (No in step S506), the movement path design unit 405 designs a movement path in order to approach the left arm of the user, and the movement control unit 406 causes the robot 100 to move to the right arm side of the user along the movement path in step S508.

Figure 8:
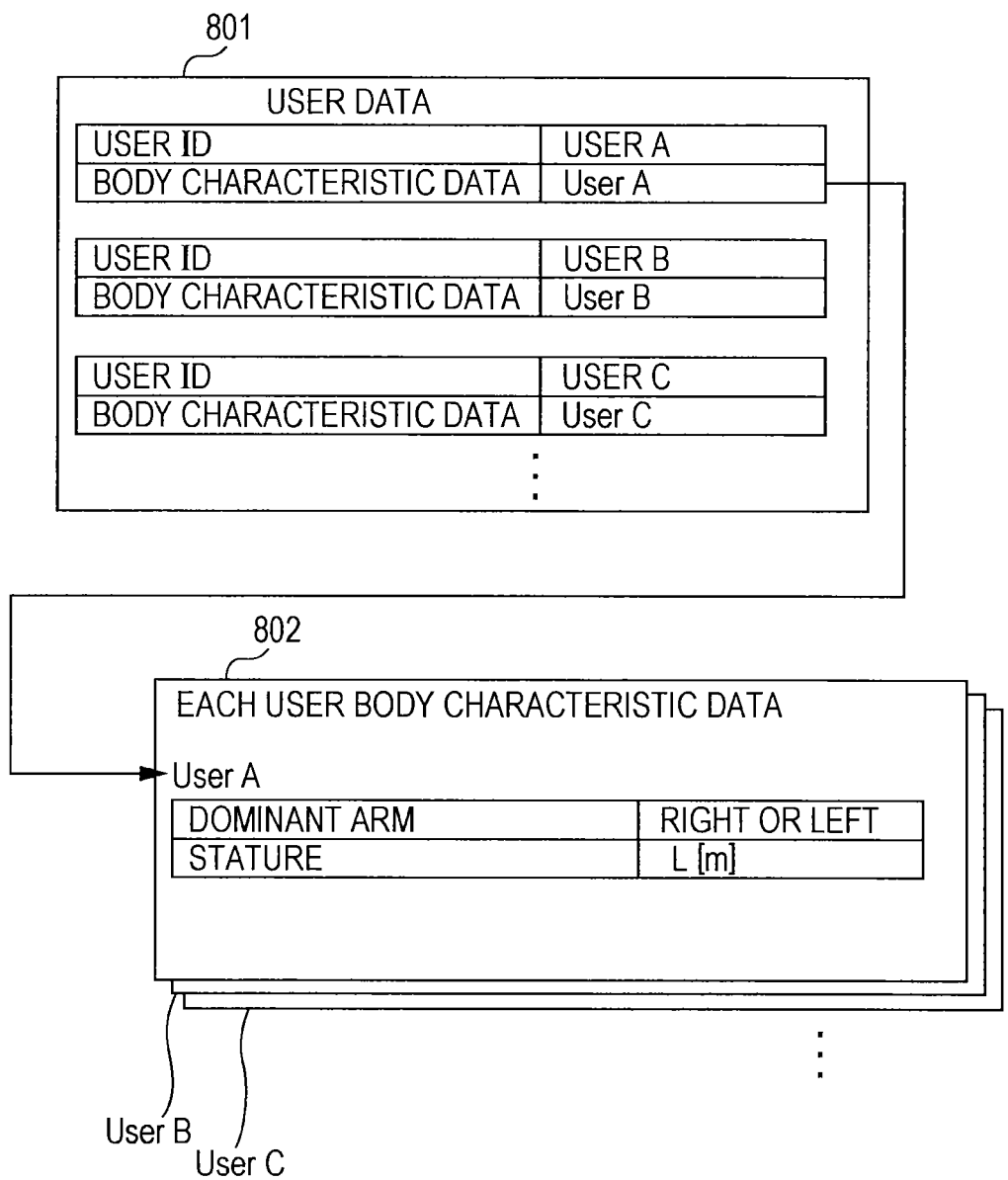
FIG. 8 is a view illustrating an example of the configuration of a user body characteristic database.

FIG. 8 shows an example of the configuration of the user body characteristic database 404. The user body characteristic database 404, which is shown in the drawing, includes user data 801 which is obtained by associating the user ID used to identify the user with a pointer to body characteristic data related to the user, and body characteristic data 802 for each user.

The body characteristic data 802 for each user includes dominant arm information which is related to the dominant arm of the user and stature information which is related to the stature of the user.

The dominant arm information is not limited to the dominant arm of the original meaning. For example, with respect to the user who is limited in a body operation because of disorders or palsies, it may be understood that the dominant arm is an arm on the side on which the user can freely move. In addition, with respect to a user who is temporarily limited in the body operation because of fractures or physical damage, it may be understood that the dominant arm is an arm on the side in which the user can freely move, an arm on the side which is appropriate to receive an object, and an arm on the side in which the user can easily receive the object. Although the dominant arm information is simply shown as "right or left" in FIG. 8, information indicative of whether or not an arm which is opposite to the dominant arm can be used, such as "right-handed but a left hand is able to hold" or "only right hand is able to hold because left hand is damaged", may be added to the dominant arm information. For example, when it is difficult to perform handing from the right side of the body of the user because of obstacles in the environment, it is possible to perform an application of determining whether or not the left side of the body of the user may be approached based on the information.

The stature information is not limited to information about the stature of the user itself. That is, the stature information may be information which is useful to presume the location of the hand of the user and which is related to the size of the body of the user, in particular, to the height. For example, a simple configuration, in which the stature information is managed by classifying into two types of categories of adults and children, may be used.

When the processing procedures shown in FIGS. 5 to 7 are performed, the dominant arm information and the stature information are registered in the user body characteristic database 404 in advance. However, the gist of the technology disclosed in the specification is not limited thereto. For example, with the combination of the voice interaction and the user, the user may teach information corresponding to the dominant arm information and the stature information, and the robot may acquire the information and update the user body characteristic database 404.

Meanwhile, there is a case where it is difficult for the user recognition unit 401 to determine the user using the facial recognition or the wireless tag because a new user inputs the instruction in step S501. In this case, a configuration may be made such that a default user, for example, "right-handed and 170 cm" is set on the user body characteristic database 404, and movement to the user is performed based on the default user.

Subsequently, the processing procedure in which the robot 100 presumes the posture of the user will be described with reference to FIG. 6.

The face posture detection unit 407 performs the facial recognition on the image photographed using the camera 321, and calculates the posture of the face at the same time during the course of the recognition process in step S601. For example, Japanese Unexamined Patent Application Publication No. 2005-284487 which has already been ceded to the present applicant in advance discloses a method of calculating the posture of a face at the same time that a facial recognition process is performed.

In addition, the face location calculation unit 408 calculates the location of the face of the user in world coordinates using a stereo camera in step S602.

Further, the user body information acquisition unit 402 inquires of the user body characteristic database 404 about the user ID, which is received from the user recognition unit 401, and acquires the user body information in step S603.

Subsequently, the user posture determination unit 409 determines which of three types of states, that is, standing, sleeping, and sitting, corresponds to the current posture of the user based on the user body information acquired using the user body information acquisition unit 402. Therefore, first, it is checked whether or not the location (height) of the face, which is acquired in step S602, almost matches the stature of the user in step S604.

When the location (height) of the face is almost matched with the stature of the user (Yes in step S604), the user posture determination unit 409 determines that the current posture of the user is standing.

On the other hand, when the location (height) of the face does not match the stature of the user (No in step S604), the user posture determination unit 409 compares the magnitude of the face posture, which is acquired in step S601, with a predetermined threshold in order to determine which of two types of states, that is, sleeping and sitting, corresponds to the current posture of the user in step S605.

Figure 9A:
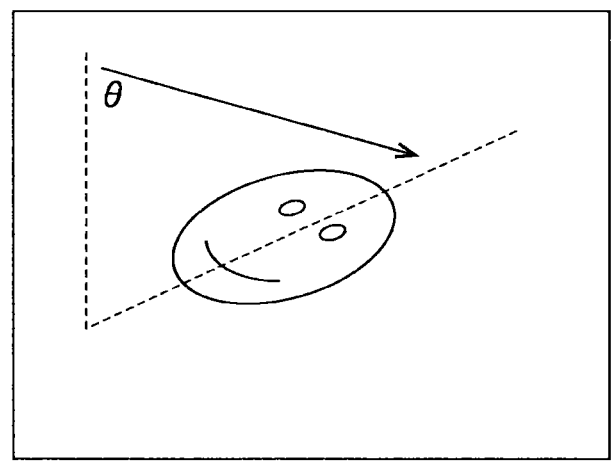
FIG. 9A is a view illustrating a user face posture when the user is lying.

Although there are 3 DOFs, that is, roll, pitch, and yaw, with respect to the posture of the face, an absolute value of the rotation angle $\theta$ (roll angle) of a camera image is used here. When the absolute vale $|\theta|$ of the rotation angle $\theta$ is greater than a certain threshold $\theta_{th}$ (Yes in step S605), the user posture determination unit 409 can determine that the user is lying as shown in FIG. 9A. Alternatively, the user posture determination unit 409 can determine that the user is lying based on the fact that the user is on the bed with reference to the environmental map 313. The reason for this, it is possible to determine that there is a strong possibility that the user is sleeping when the face of the user is on the bed.

Figure 9B:
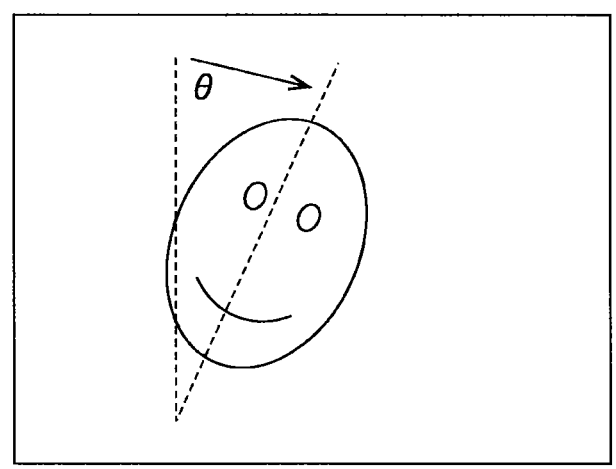
FIG. 9B is a view illustrating the user face posture when the user is standing or sitting.

In addition, when the absolute value $|\theta|$ of the rotation angle $\theta$ is lower than the certain threshold $\theta_{th}$ (No in step S605), the user posture determination unit 409 can determine that the user is standing or sitting as shown in FIG. 9B. Since it has been already clear that the location (height) of the face is not matched with the stature (No in step S604) and the user is not standing, it is determined that the user is sitting here. Alternatively, the user posture determination unit 409 can determine that the user is sitting based on the fact that the user is on the sofa with reference to the environmental map 313.

Subsequently, the processing procedure which is performed from when the robot 100 presumes the location of the hand of the user to when the robot 100 hands the object will be described with reference to FIG. 7.

Figure 10A:
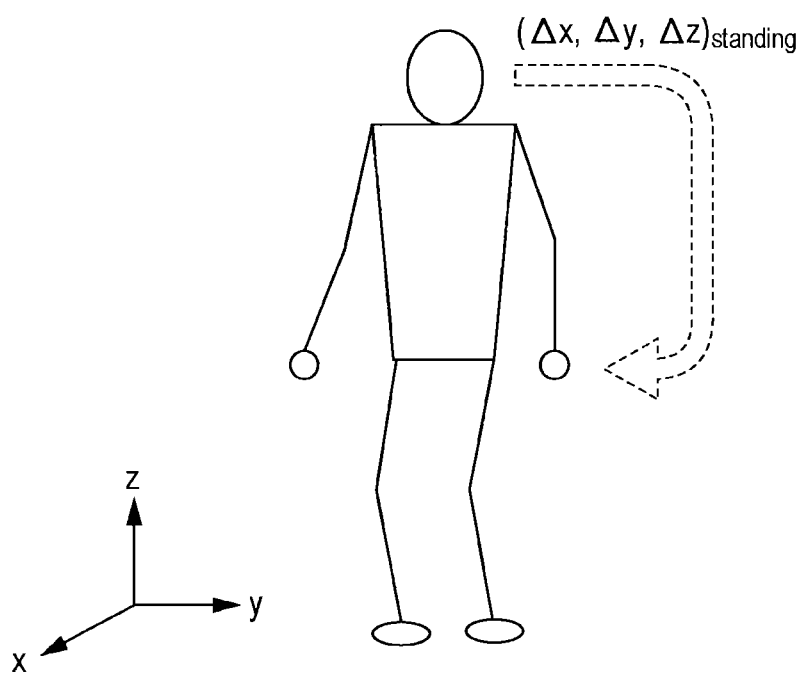
FIG. 10A is a view illustrating a personal standing body model.

When the fact that the user is standing is understood after the processing procedure shown in FIG. 6 is performed in step S701, the user hand location calculation unit 410 calculates the current location of the hand of the dominant arm of the user which is determined in step S506, that is, the direction in which the user who is standing can easily obtain the object and the height in which a hand of the user reaches and the user can easily obtain the object, based on a personal standing body model shown in FIG. 10A and the user stature information, which is acquired in step S603, in step S702.

Figure 10B:
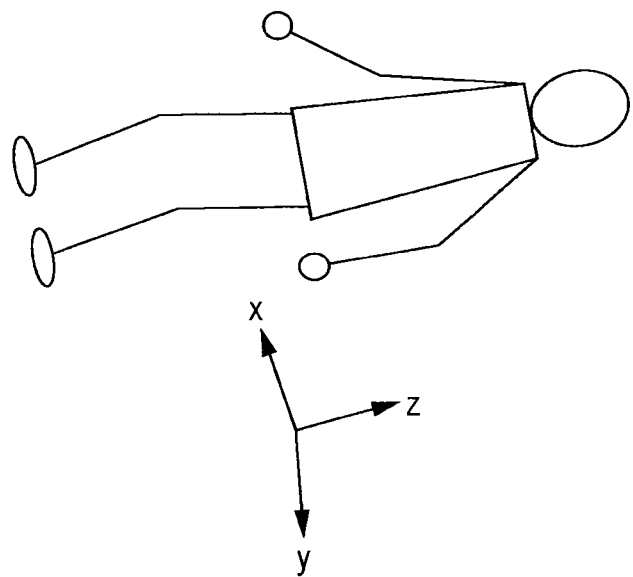
FIG. 10B is a view illustrating a personal lying body model.

In addition, when the fact that the user is lying is understood after the processing procedure shown in FIG. 6 is performed in step S703, the user hand location calculation unit 410 calculates the current location of the hand of the dominant arm of the user, which is determined in step S506, that is, the direction in which the user who is lying can easily obtain the object and the height in which the hand of the user reaches and the user can easily obtain the object, based on a personal lying body model shown in FIG. 10B and the user stature information, which is acquired in step S603, in step S704.

Figure 10C:
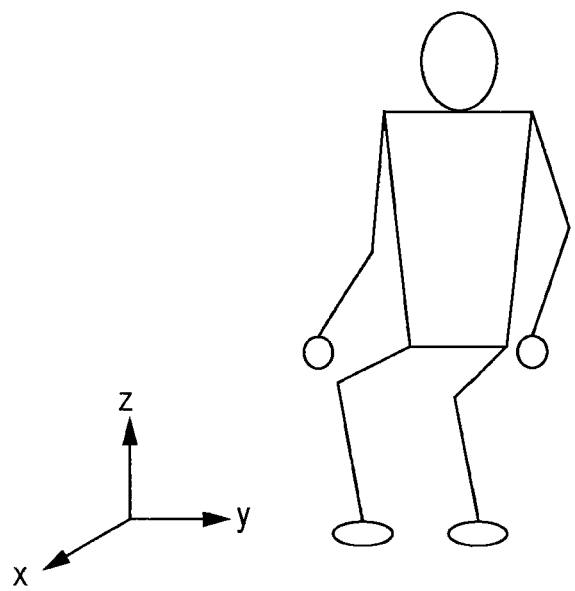
FIG. 10C is a view illustrating a personal sitting body model.

In addition, when the fact that the user is sitting is understood after the processing procedure shown in FIG. 6 is performed in step S705, the user hand location calculation unit 410 calculates the current location of the hand of the dominant arm of the user, which is determined in step S506, that is, the direction in which the user who is sitting can easily obtain the object and the height in which the hand of the user reaches and the user can easily obtain the object, based on a personal sitting body model shown in FIG. 10C and the user stature information, which is acquired in step S603, in step S706.

Coordinate conversion is performed on the location of the hand of the dominant arm of the user, which is calculated using the user hand location calculation unit 410, using the posture of the location of the face of the user in the world coordinates, which is calculated in step S602. The arm orbit design unit 411 designs the orbit of either of the right and left arm sections in order to transfer the object to the user in the location of the hand. Thereafter, the arm control unit 412 controls the drive of each of the joint actuators of the dominant arm section such that the arm section moves along the orbit of the arm section, which is designed using the arm orbit design unit 411, and presents the object in step S707.

Here, a method of calculating the location of the hand of the user, which is performed in steps S702, S704, and S706, will be described.

The basic posture of the user who performs the object transfer interaction with the robot 100 is classified into three states, that is, standing, sleeping, and sitting, and personal body models corresponding to the states are considered as in FIGS. 10A, 10B, and 10C, respectively. Thereafter, a coordinate system is set to forward x, leftward y, and upward z with respect to each of the models when viewed from the user.

In a personal standing body model shown in FIG. 10A, the location of the hand ($\Delta x$, $\Delta y$, $\Delta z$)$_{standing}$ based on the location of the face is defined in the following Equation 1.

$$\Delta x = L \times \alpha_{1x} + \beta_{1x} \quad (1)$$
$$\Delta y = \begin{cases} -(L \times \alpha_{1y} + \beta_{1y}) : \text{RIGHT HAND} \\ (L \times \alpha_{1y} + \beta_{1y}) : \text{LEFT HAND} \end{cases}$$
$$\Delta z = -(L \times \alpha_{1z} + \beta_{1z})$$

However, in the above Equation 1, L is the stature of a person. In addition, $\alpha$ and $\beta$ are parameters which are obtained by measuring the dimensions of a human body. Based on the parameter $\alpha$ which depends on the stature and the parameter $\beta$ which does not depend on the stature, the location of the hand of the dominant arm is calculated.

In the same way, in a personal lying body model shown in FIG. 10B, the location of the hand ($\Delta x$, $\Delta y$, $\Delta z$)$_{lying}$ based on the location of the face is defined in the following Equation 2.

$$\Delta x = L \times \alpha_{2x} + \beta_{2x} \quad (2)$$
$$\Delta y = \begin{cases} -(L \times \alpha_{2y} + \beta_{2y}) : \text{RIGHT HAND} \\ (L \times \alpha_{2y} + \beta_{2y}) : \text{LEFT HAND} \end{cases}$$
$$\Delta z = -(L \times \alpha_{2z} + \beta_{2z})$$

In addition, in a personal sitting body model shown in FIG. 10C, the location of the hand ($\Delta x$, $\Delta y$, $\Delta z$)$_{sitting}$ based on the location of the face is defined in the following Equation 3.

$$\Delta x = L \times \alpha_{3x} + \beta_{3x} \quad (3)$$
$$\Delta y = \begin{cases} -(L \times \alpha_{3y} + \beta_{3y}) : \text{RIGHT HAND} \\ (L \times \alpha_{3y} + \beta_{3y}) : \text{LEFT HAND} \end{cases}$$
$$\Delta z = -(L \times \alpha_{3z} + \beta_{3z})$$

FIG. 11A shows a situation in which, when it is determined that the user is standing, the robot 100 presents the object to the location of the hand of the user, which is determined as the dominant arm, based on the personal standing body model and the user stature information.

Figure 12:
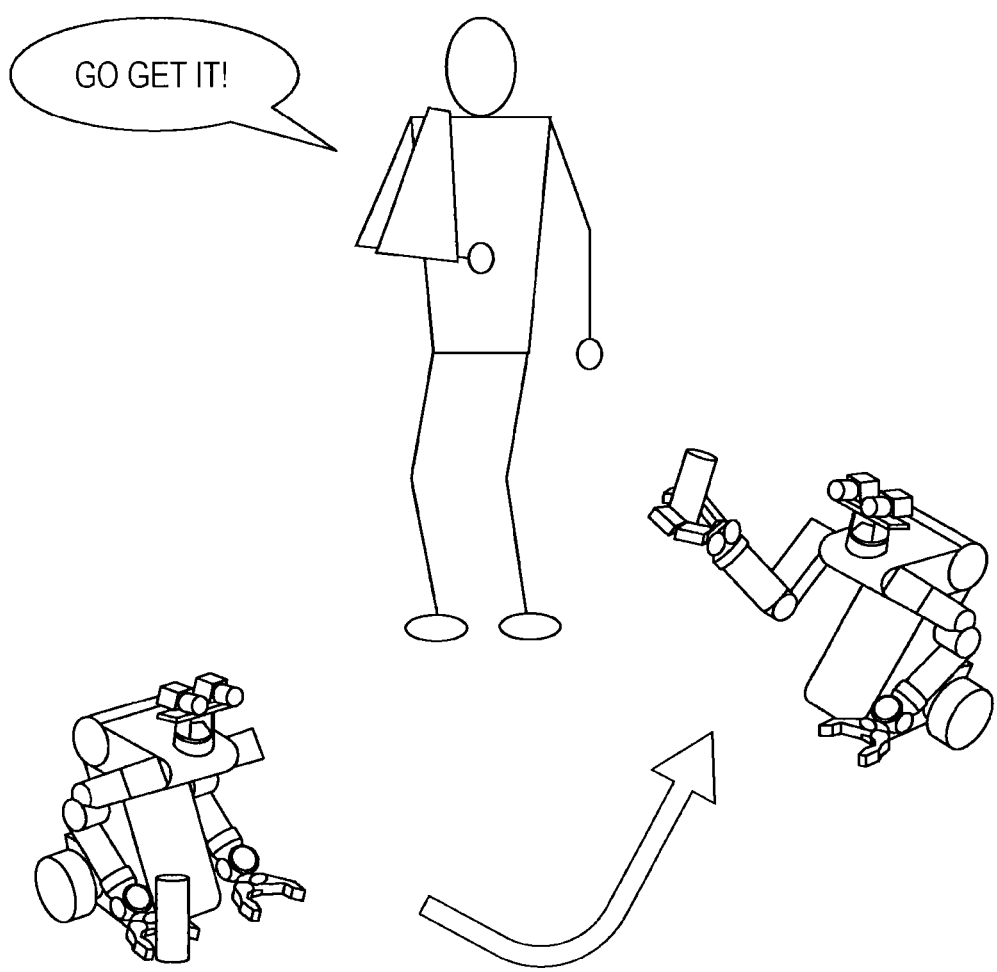
FIG. 12 is a view illustrating a situation in which the robot presents the object to the location of a hand on the side, which is not damaged (the side which is easy to receive), of the standing user.

As described above, when the operation of the body is temporarily limited because of fractures or physical damage of the original dominant arm of the user, the arm on the opposite side is determined as the dominant arm. FIG. 12 shows a situation in which the robot 100 presents the object to the location of the hand, which is not damaged (which is easy to receive the object), of the standing user.

In addition, FIG. 11B shows a situation in which, when it is determined that the user is sitting, the robot 100 presents the object to the location of the hand of the user, which is determined as the dominant arm, based on the personal sitting body model and the user stature information. Compared to the case, shown in FIG. 11A, where the object is presented to the user who is standing, it is understood that the height of the location to which the robot 100 raises the object is low when the object is presented to a user who is sitting.

As described above, the robot 100 determines the dominant arm of the user, or determines which of the right side of the body or the left side of the body is easier for the user to operate (or, is good at operating) due to hemiplegia or fractures. Further, the object can be handed while the direction in which the user easily takes the object and height in which the hand of the user reaches or the object is easily taken are taken into consideration based on the body characteristics, such as the stature of the user or the current posture of the user (sitting on sofa or sleeping on the bed). Therefore, according to the technology disclosed in the specification, the user can receive the object with relaxed posture (without fatigue). The user can perform natural interaction with the robot while burdens are reduced when the user receives the object from the robot.

Meanwhile, the technology disclosed in the specification can be configured as described below.

(1) A robot apparatus includes: a reception arm determination unit that determines from a left arm or a right arm of a user a reception arm which is used in handing of an object; a hand location calculation unit that calculates a current location of a hand of the reception arm; and a handing operation unit that performs an object handing operation at the location of the hand of the reception arm which is calculated using the hand location calculation unit.

(2) In the robot apparatus of (1), the reception arm determination unit determines the reception arm of the user based on body characteristic information which is related to the dominant arm of the user, the presence of disabilities of an arm, or an arm which easily performs an object reception operation.

(3) In the robot apparatus of (2), the body characteristic information, which is related to the dominant arm of the user, the presence of the disabilities of the arm, or the arm which easily performs the object reception operation for each user, is included in a user body characteristic database as previous knowledge, and the reception arm determination unit acquires the body characteristic information, which is related to the dominant arm of the user who performs object transfer, the presence of the disabilities of the arm, or the arm which easily performs the object reception operation, with reference to the user body characteristic database.

(4) The robot apparatus of (1) further includes: a user stature information acquisition unit that acquires information related to stature of the user; and a user posture determination unit that determines current posture of the user. The hand location calculation unit calculates the current location of the hand of the reception arm based on the stature of the user and the current posture of the user.

(5) In the robot apparatus of (4), the body characteristic information, which is related to the stature for each user, is included in the user body characteristic database as the previous knowledge. The hand location calculation unit acquires the body characteristic information, which is related to the stature of the user who performs object transfer with reference to the user body characteristic database.

(6) In the robot apparatus of (4), a body model of each posture, that is, standing, lying, or sitting, is included. The hand location calculation unit calculates the current location of the hand of the reception arm by applying the stature of the user which is acquired using the user stature information acquisition unit to a body model corresponding to the current posture of the user which is determined using the user posture determination unit.

(7) The robot apparatus of (4) further includes a face position calculation unit that calculates a location of a face of the user. The user posture determination unit determines whether or not the posture of the user is standing by comparing the stature of the user which is acquired using the user stature information acquisition unit with the location of the face of the user.

(8) The robot apparatus of (7) further includes a face posture detection unit that detects posture of the face of the user. The user posture determination unit, when the posture of the user is not standing, determines whether the posture of the user is lying or sitting based on the posture of the face of the user which is detected using the face posture detection unit.

(9) The robot apparatus of (1) further includes: a movement unit that moves a location of the robot apparatus; and an arm section that is capable of grasping the object. The handing operation unit performs an operation of moving to the reception arm of the user using the movement unit, and presents the object which is grasped using the arm section to the location of the hand of the reception arm.

(10) The robot apparatus of (4) further includes an environmental map that is related to surrounding environments of the robot apparatus. The user posture determination unit determines the current posture of the user by referring to the environmental map for environments of the location of the user.

(11) A robot apparatus control method includes: determining from a left arm or a right arm of a user a reception arm which is used in handing of an object; calculating a current location of a hand of the reception arm; and performing an object handing operation at the location of the hand of the reception arm which is calculated using the hand location calculation unit.

(12) A computer program written in a computer-readable format in order to control a robot apparatus and causing a computer to function as: a reception arm determination unit that determines from a left arm or a right arm of a user a reception arm which is used in handing of an object; a hand location calculation unit that calculates a current location of a hand of the reception arm; and a handing operation unit that performs an object handing operation at the location of the hand of the reception arm which is calculated using the hand location calculation unit.

The present disclosure contains subject matter related to that disclosed in Japanese Priority Patent Application JP 2011-263264 filed in the Japan Patent Office on Dec. 1, 2011, the entire contents of which are hereby incorporated by reference.

In conclusion, although the technology disclosed in the specification has been described in the form of exemplification, content disclosed in the specification should not be limitedly understood. In order to determine the gist of the technology disclosed in the specification, claims should be referred to.

What is claimed is:

1. A robot apparatus comprising:
a computer operable to:
    determine from a left arm or a right arm of a user a reception arm which is to be used in handing of an object;
    acquire information related to a stature of the user;
    calculate a location of a face of the user, wherein the computer determines whether or not a current posture of the user is standing by comparing the stature of the user with the location of the face of the user;
    detect a posture of the face of the user, wherein the computer, when the posture of the user is not standing, determines whether the posture of the user is lying or sitting based on the detected posture of the face of the user;
    calculate a current location of a hand of the reception arm, wherein the computer calculates the current location of the hand of the reception arm based on the stature of the user and the current posture of the user; and
    perform an object handing operation at the calculated current location of the hand of the reception arm.

2. The robot apparatus according to claim 1, wherein the computer determines the reception arm of the user based on body characteristic information which is related to a dominant arm of the user, presence of disabilities of an arm, or an arm which easily performs an object reception operation.

3. The robot apparatus according to claim 2, wherein the body characteristic information, which is related to the dominant arm of the user, the presence of the disabilities of the arm, or the arm which easily performs the object reception operation for each user, is included in a user body characteristic database as previous knowledge, and wherein the computer acquires the body characteristic information, which is related to the dominant arm of the user who performs object transfer, the presence of the disabilities of the arm, or the arm which easily performs the object reception operation, with reference to the user body characteristic database.

4. The robot apparatus according to claim 1, wherein the body characteristic information, which is related to the stature for each user, is included in a user body characteristic database as previous knowledge, and wherein the computer acquires the body characteristic information, which is related to the stature of the user who performs object transfer with reference to the user body characteristic database.

5. The robot apparatus according to claim 1, wherein a body model of each posture, that is, standing, lying, or sitting, is included, and wherein the computer calculates the current location of the hand of the reception arm by applying the acquired stature of the user to a body model corresponding to the determined current posture of the user.

6. The robot apparatus according to claim 1, further comprising:
 a movement unit that moves a location of the robot apparatus; and
 an arm section that is capable of grasping the object, wherein the computer performs an operation of moving to the reception arm of the user using the movement unit, and presents the object which is grasped using the arm section to the current location of the hand of the reception arm.

7. The robot apparatus according to claim 1, further comprising:
 an environmental map that is related to surrounding environments of the robot apparatus, wherein the computer determines the current posture of the user by referring to the environmental map for environments of the location of the user.

8. A robot apparatus control method comprising:
 determining from a left arm or a right arm of a user a reception arm which is to be used in handing of an object;
 acquiring information related to a stature of the user;
 calculating a location of a face of the user, wherein a computer determines whether or not a current posture of the user is standing by comparing the stature of the user with the location of the face of the user;
 detecting a posture of the face of the user, wherein the computer, when the posture of the user is not standing, determines whether the posture of the user is lying or sitting based on the detected posture of the face of the user;
 calculating a current location of a hand of the reception arm, wherein the computer calculates the current location of the hand of the reception arm based on the stature of the user and the current posture of the user; and
 performing an object handing operation at the calculated current location of the hand of the reception arm.

9. A non-transitory computer-readable medium, having stored thereon, a set of computer-executable instructions for causing a computer to:
 determine from a left arm or a right arm of a user a reception arm which is to be used in handing of an object;
 acquire information related to a stature of the user;
 calculate a location of a face of the user, wherein the computer determines whether or not a current posture of the user is standing by comparing the stature of the user with the location of the face of the user;
 detect a posture of the face of the user, wherein the computer, when the posture of the user is not standing, determines whether the posture of the user is lying or sitting based on the detected posture of the face of the user;
 calculate a current location of a hand of the reception arm, wherein the computer calculates the current location of the hand of the reception arm based on the stature of the user and the current posture of the user; and
 perform an object handing operation at the calculated current location of the hand of the reception arm.

* * * * *